(12) United States Patent
Waltermann et al.

(10) Patent No.: US 12,432,190 B2
(45) Date of Patent: Sep. 30, 2025

(54) SUPPORT FOR CONCURRENT IDENTITIES IN AN IDENTITY MANAGEMENT SOLUTION

(71) Applicant: Lenovo (Singapore) Pte. Ltd., Singapore (SG)

(72) Inventors: Rod D Waltermann, Rougemont, NC (US); Igor Stolbikov, Apex, NC (US); Sergei Rodionov, Plano, TX (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 147 days.

(21) Appl. No.: 18/389,468

(22) Filed: Nov. 14, 2023

(65) Prior Publication Data

US 2025/0158973 A1     May 15, 2025

(51) Int. Cl.
*H04L 9/40*     (2022.01)

(52) U.S. Cl.
CPC ........ *H04L 63/0807* (2013.01); *H04L 63/105* (2013.01); *H04L 63/108* (2013.01)

(58) Field of Classification Search
CPC .. H04L 63/0807; H04L 63/105; H04L 63/108
See application file for complete search history.

(56) References Cited

U.S. PATENT DOCUMENTS

| | | | | |
|---|---|---|---|---|
| 8,327,429 B2 * | 12/2012 | Speyer | ................... | G06Q 10/06 726/20 |
| 8,578,454 B2 * | 11/2013 | Grim | ..................... | H04W 12/50 713/168 |
| 8,955,080 B2 * | 2/2015 | Brunswig | ........... | H04L 63/0815 726/8 |
| 9,280,765 B2 * | 3/2016 | Hammad | ........... | G06Q 20/3674 |
| 10,681,039 B2 * | 6/2020 | Alzate | ................. | H04L 63/0815 |
| 11,128,660 B2 * | 9/2021 | O'Connor | ........... | H04L 63/1466 |
| 11,159,511 B1 * | 10/2021 | Geusz | .................. | H04L 63/102 |
| 11,463,426 B1 * | 10/2022 | Wheeler | ............... | H04L 63/102 |
| 11,736,296 B2 * | 8/2023 | Wang | ...................... | G06Q 20/02 |
| 11,943,215 B1 * | 3/2024 | Nair | ....................... | H04L 9/3226 |
| 11,947,650 B2 * | 4/2024 | Wang | .................. | H04L 63/0435 |

(Continued)

OTHER PUBLICATIONS

Ahmad, Azeem, Muhammad Mustafa Hassan, and Abdul Aziz. "A multi-token authorization strategy for secure mobile cloud computing." 2014 2nd IEEE International Conference on Mobile Cloud Computing, Services, and Engineering. IEEE, 2014.*

*Primary Examiner* — Jimmy H Tran

(74) *Attorney, Agent, or Firm* — Schwegman Lundberg & Woessner, P.A.

(57) ABSTRACT

An apparatus can include an interface for receiving authentication tokens from a user. The apparatus can include processing circuitry coupled to the interface. The processing circuitry can receive, over the interface, a first authentication token of the user and at least a second authentication token of the user. The processing circuitry can determine whether the first authentication token and at least the second authentication token correspond to an identity associated with the user. The processing circuitry can validate a computing session responsive to determining that the first authentication token and at least the second authentication token can be linked to the identity. Other methods and systems are described.

20 Claims, 5 Drawing Sheets

(56) References Cited

U.S. PATENT DOCUMENTS

| | | | |
|---|---|---|---|
| 2005/0114701 A1* | 5/2005 | Atkins | H04L 63/08 726/4 |
| 2006/0200424 A1* | 9/2006 | Cameron | H04L 63/08 705/64 |
| 2006/0236382 A1* | 10/2006 | Hinton | G06F 21/41 726/8 |
| 2008/0168539 A1* | 7/2008 | Stein | H04L 63/0815 726/5 |
| 2009/0259848 A1* | 10/2009 | Williams | H04L 9/3228 713/168 |
| 2010/0281252 A1* | 11/2010 | Steeves | G06F 21/72 713/155 |
| 2011/0154465 A1* | 6/2011 | Kuzin | H04L 67/08 726/9 |
| 2011/0296522 A1* | 12/2011 | Speyer | H04L 9/3228 726/20 |
| 2012/0174198 A1* | 7/2012 | Gould | H04L 63/0807 726/6 |
| 2012/0227098 A1* | 9/2012 | Obasanjo | H04L 63/0807 726/8 |
| 2012/0259782 A1* | 10/2012 | Hammad | G06Q 20/3674 705/44 |
| 2013/0104198 A1* | 4/2013 | Grim | H04L 63/08 726/4 |
| 2014/0068723 A1* | 3/2014 | Grim | H04L 63/08 726/4 |
| 2014/0165150 A1* | 6/2014 | Brunswig | G06F 21/41 726/4 |
| 2015/0067813 A1* | 3/2015 | Cha | H04L 63/0807 726/10 |
| 2015/0128242 A1* | 5/2015 | Hoy | H04L 63/0884 726/9 |
| 2015/0244706 A1* | 8/2015 | Grajek | H04L 63/0815 726/6 |
| 2015/0381602 A1* | 12/2015 | Grim | H04W 12/30 726/4 |
| 2015/0381633 A1* | 12/2015 | Grim | H04L 63/0861 726/4 |
| 2015/0382195 A1* | 12/2015 | Grim | H04W 12/06 726/4 |
| 2016/0140542 A1* | 5/2016 | Hammad | G06Q 20/3674 705/67 |
| 2017/0187708 A1* | 6/2017 | Moore | H04L 63/0807 |
| 2018/0013763 A1* | 1/2018 | Wilson | H04L 63/101 |
| 2018/0075231 A1* | 3/2018 | Subramanian | H04L 63/0807 |
| 2019/0058706 A1* | 2/2019 | Feijoo | G06F 21/335 |
| 2019/0215320 A1* | 7/2019 | Alzate | G06F 16/955 |
| 2019/0394232 A1* | 12/2019 | O'Connor | G06F 21/604 |
| 2020/0137042 A1* | 4/2020 | Kannan, III | H04L 63/083 |
| 2020/0374121 A1* | 11/2020 | Momchilov | H04L 9/0825 |
| 2021/0021605 A1* | 1/2021 | Innes | H04L 63/104 |
| 2021/0037004 A1* | 2/2021 | Gordon | H04L 63/0815 |
| 2021/0136058 A1* | 5/2021 | Lopez | H04L 63/0853 |
| 2021/0243029 A1* | 8/2021 | Wang | H04L 9/3236 |
| 2021/0336946 A1* | 10/2021 | Cheng | H04L 67/10 |
| 2021/0385210 A1* | 12/2021 | Olden | H04L 63/0892 |
| 2021/0390170 A1* | 12/2021 | Olden | H04L 63/08 |
| 2021/0392048 A1* | 12/2021 | Olden | H04L 67/56 |
| 2022/0191185 A1* | 6/2022 | Carmon | H04L 63/20 |
| 2022/0255931 A1* | 8/2022 | Avetisov | H04L 9/3247 |
| 2023/0075296 A1* | 3/2023 | Morley, III | H04L 63/0807 |
| 2023/0129824 A1* | 4/2023 | Hettiarachchi | H04L 63/104 726/4 |
| 2023/0275893 A1* | 8/2023 | Sharma | H04L 63/0807 726/9 |
| 2023/0421583 A1* | 12/2023 | Olden | H04L 63/0807 |
| 2024/0220968 A1* | 7/2024 | Pearce | H04L 63/0884 |
| 2025/0080521 A1* | 3/2025 | Patange | H04L 63/0815 |
| 2025/0112907 A1* | 4/2025 | McGuinness | H04L 63/0807 |
| 2025/0119417 A1* | 4/2025 | Doherty | G06F 21/64 |
| 2025/0175468 A1* | 5/2025 | Shyamala | H04L 63/105 |

* cited by examiner

SUPPORT FOR CONCURRENT IDENTITIES IN AN IDENTITY MANAGEMENT SOLUTION

TECHNICAL FIELD

Embodiments described herein generally relate to user authentication, and in an embodiment, but not by way of limitation, to multi-party user attestation.

BACKGROUND

Many people today own at least two electronic devices. Users may need to provide separate authentication to access each device. There is a general need for a system that facilitates authentication of a user identity across many operating systems and environments.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
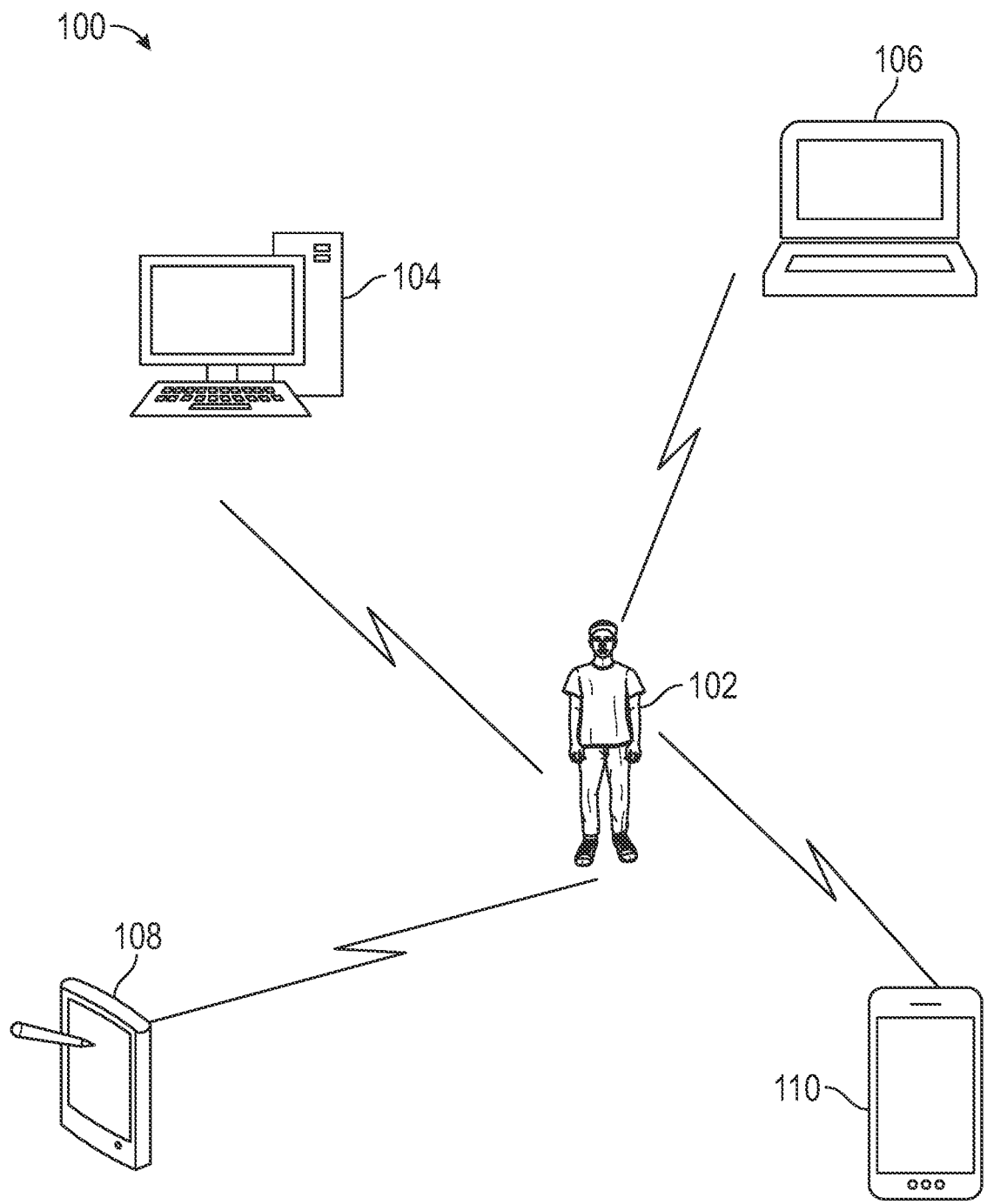
FIG. 1 illustrates a system in which example embodiments can be implemented.

Today, many people own several electronic devices. These several devices can each run on different operating systems or platforms. For example, FIG. 1 illustrates a system 100, in which user 102 owns and operates a desktop computer 104, a laptop 106, a tablet computer 108 and a smart phone 110. At least one of the desktop computer 104, laptop 106, tablet computer 108 or smart phone 110 can operate using a different operating system than the other devices shown in system 100. The operating system provider on each device in system 100 may request identity management before the user 102 can use the respective device. Sometimes users also have personal accounts and work accounts for each device or for each operating system.

These different requirements can result in a computer ecosystem in which a user 102 has to remember multiple sets of account information and login information. This forces a user to maintain multiple identities, which in turn adds complexity to the user 102 experience with no discernible user benefit.

Apparatuses and methods according to embodiments can leverage these multiple identities to enhance user experience. In some examples, systems can leverage multiple authentication sessions with trusted identity and access management (IAM) solutions to provide an increased trust or confidence level in the authentication process, because the user 102 identity is attested by multiple parties.

Figure 2:
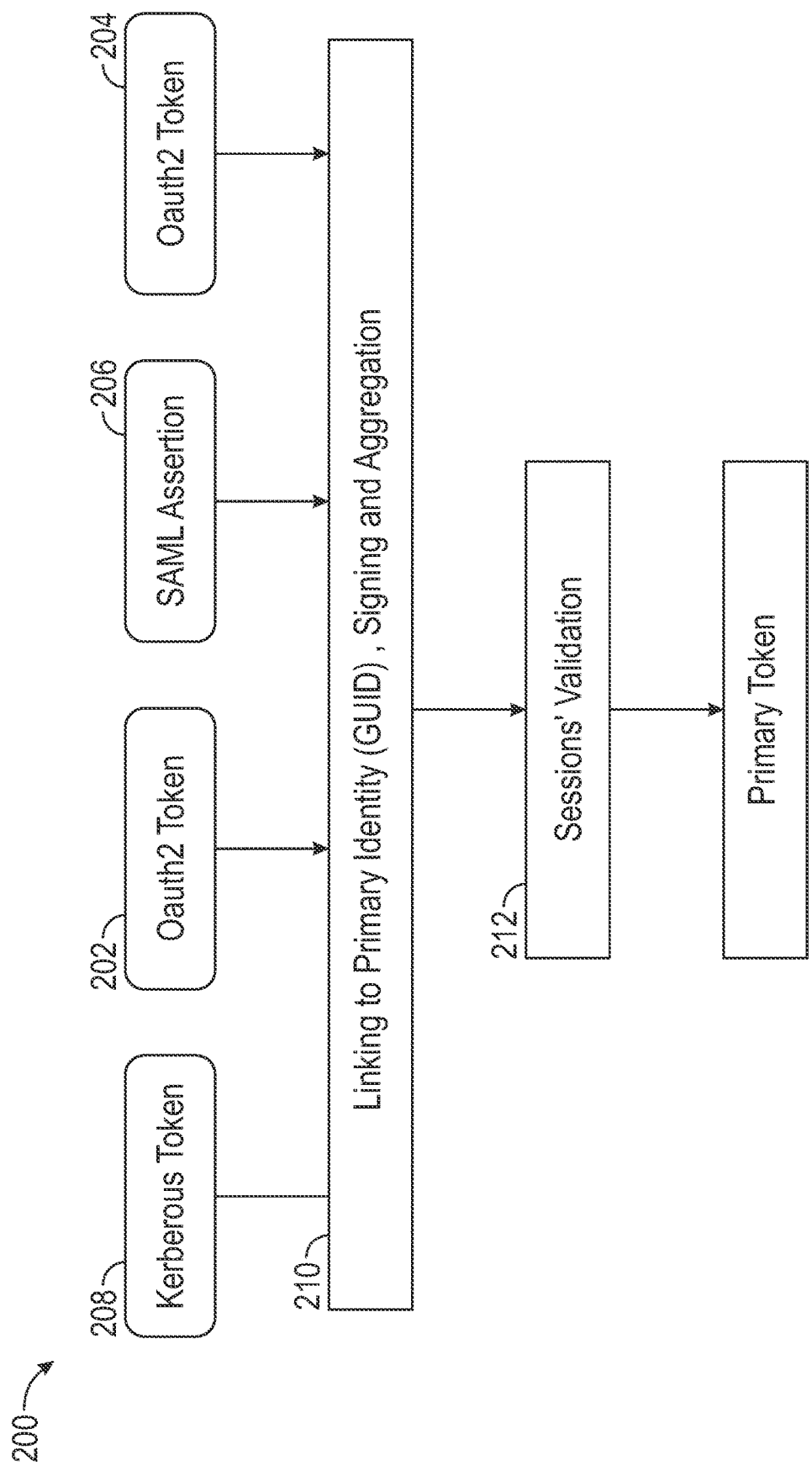
FIG. 2 illustrates a communication flow diagram according to example embodiments.

FIG. 2 illustrates a communication flow diagram 200 according to example embodiments. In embodiments, a user 102 (FIG. 1) can log on to different devices each potentially using a different IAM solution. Processing circuitry provides an identity management method 210 wherein a primary user identity is validated through multiple (or at least two) existing sessions that have been authenticated using different identity systems using, for example, Authentication/Single Sign On (SSO) session management methods. For example, as shown in FIG. 2 a user logging into an operating system may already have another valid authentication token (from a different operating system, application (such as email) etc.) that can be used as a second authentication factor.

In examples, these authentication factors can include (but are not limited to) Open Authorization (OAuth) tokens 202 and 204, Security Assertion Markup Language (SAML) tokens or assertions 206, Kerberos tickets or tokens 208, OpenID Connect (OIDC) tokens, etc. Websites or applications can use OAuth to access resources hosted by other web applications on behalf of a user. OAuth is based on the JavaScript Object Notation (JSON) format. OIDC is an authentication framework built on top of the OAuth 2.0 protocol and uses an additional JSON Web Token (JWT) data. SAML is an XML based authentication and authorization framework for sharing identity-based data between different organizations. Kerberos is a ticket-based authentication protocol for sharing authentication and authorization data over non-secure networks. Kerberos is built over symmetric-key cryptography and use of the trusted Ticket Granting and authentication third-party services.

When sessions are validated at block 212, processing circuitry can map a primary identity to each of these existing authentication factors/sessions to allow automatic login without any actions from the user. A primary token can be provided at block 214. Multiple devices (e.g., the devices shown in FIG. 1) can be linked together to work as an ecosystem. Further, since the user has proven authentication on a plurality of different platforms or systems, a trust level can be granted to the user for enhanced security.

Subsequent to the operations shown in FIG. 2, the user 102 (FIG. 1) will have access to the multiple identifiers used to log in to various devices/applications, in addition to the primary identifier or token 214. Because multiple identifiers have been authenticated for the user 102, an additional layer of security and trust can be conferred on the user. In examples, the additional security and trust can be seen in a reduction in the necessity to log in to further applications, enhanced or privileged access to applications, access to other devices, etc. User devices can be operated from the same primary identity even though from the point of view of the user 102, the user 102 is logged into several different identities. Once a connection is made between devices, because of the way the token mechanism works, even if one of the passwords or other authentication information is changed on one or more of the user devices (or application executing thereon), internal mapping allows the user 102 to continue using all the devices without re-authenticating or logging in.

Figure 3:
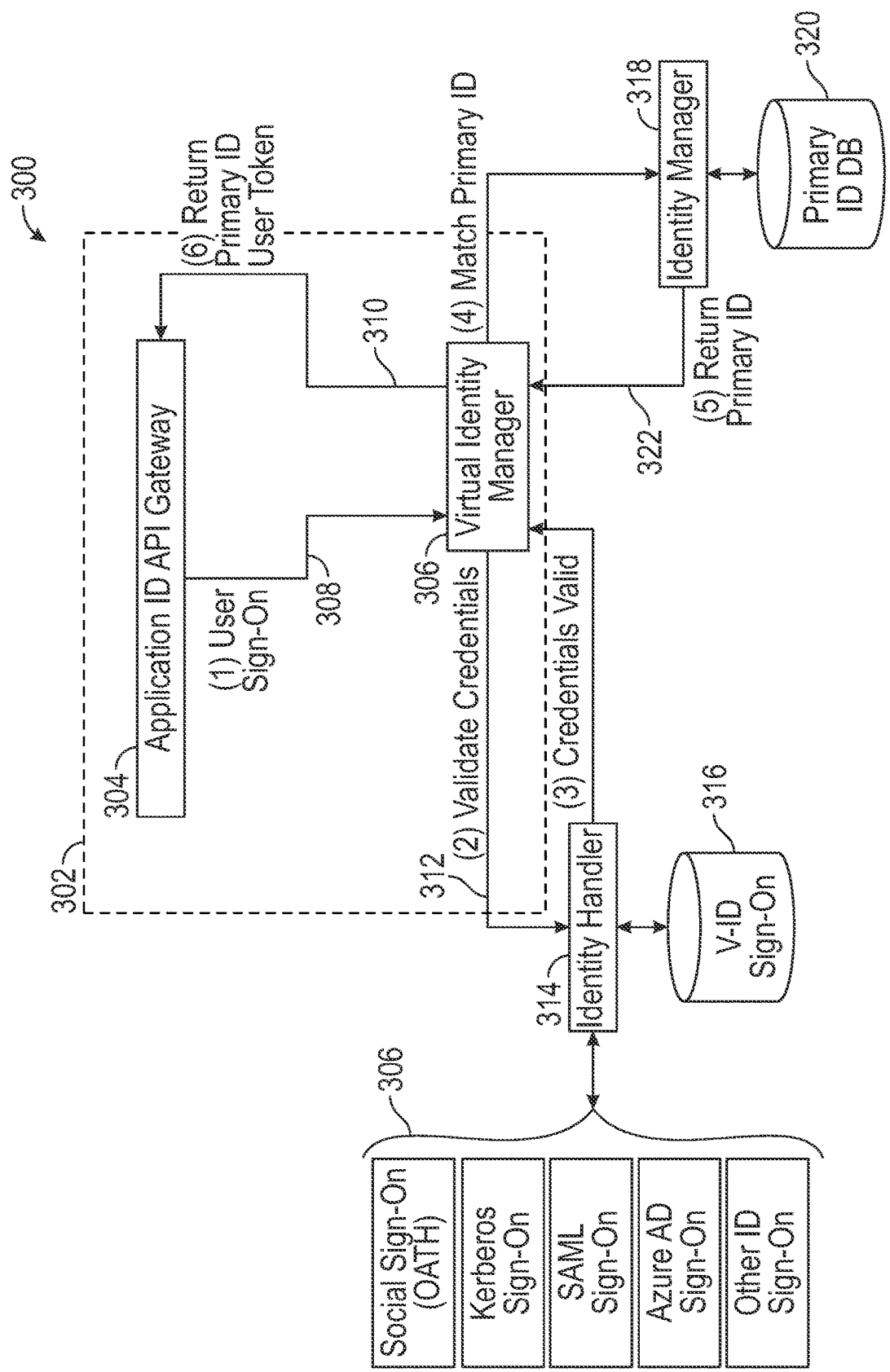
FIG. 3 illustrates a system architecture including an apparatus according to some embodiments.

FIG. 3 illustrates a system architecture 300 including an apparatus 302 according to some embodiments. The apparatus can include an interface 304 for receiving authentication tokens from a user (e.g., user 102 (FIG. 1)) The interface 304 can comprise a web portal or other set of functionality or application for authorization of identity-based logins. The interface 304 can be based on various protocols 306 including OAuth) protocols, Kerberos protocols, SAML protocols, Azure protocols, etc. Embodiments are not limited to the protocols shown. Rather, any protocol for performing authentication and login can be used and the interface 304 can include functionality for handling any or all authentication protocol.

The interface 304 can include many different separate sets of interface/s or circuitry for handling various authentication protocols 306. Processing circuitry 310 can be coupled to the interface 304. As seen in FIG. 3, the different communication/s can be mapped to the user sign-on mechanism (e.g., a validation request 308) that is provided to the processing circuitry 310. The validation request 308 can include authentication tokens of the user. The authentication tokens can be produced as the result of authentication or logging in by the user 102 within various applications or devices.

The processing circuitry 310 can detect protocol information of the validation requests and perform validation based on the detected protocol. To perform this validation, the processing circuitry 310 can generate communication 312. Communication 312 can include credentials such as tokens, and communication 312 can be provided to the identity handler circuitry 314. The identity handler circuitry 314 can validate these credentials using the protocol that corresponds to the credentials (e.g., as provided by the interface 304). Handshake mechanisms, etc. (based on the appropriate protocol) are executed to validate credentials at block 316.

The processing circuitry 306 can determine whether the plurality of authentication tokens correspond to an identity associated with the user by using the identity manager 318 to map authentication tokens to a primary identity/token. The identity manager 318 can retrieve a primary token from the database 320 and this primary token can be returned to the processing circuitry at communication 322. The database 320 can store the primary token/s such that they are associated with the identities, authentication information, tokens, etc. of the user, as well as any identities, authentication information, tokens provided at a later time by the user 102. The database 320 can accordingly comprise a relational database or database table for maintaining relationships of identities to users, among other relationships. The primary token/s can comprise an aggregation of multiple authentication tokens.

The processing circuitry 306 can return this primary token to the interface 304 at communication 310. With the primary token, user 202 can perform any activities as described with respect to FIG. 1 and FIG. 2. In examples, the processing circuitry 306 can detect whether the primary token is expired and generate a new primary token responsive to detecting that the primary token is expired. The time frame for expiration can be based on the security level of the application, device, or protocol used, or the activity that the user 102 is performing.

Responsive to receiving subsequent validation requests of the user subsequent to the first validation request, the processing circuitry 306 can provide the primary token upon validating that the subsequent validation requests correspond to the user 202.

Figure 4:
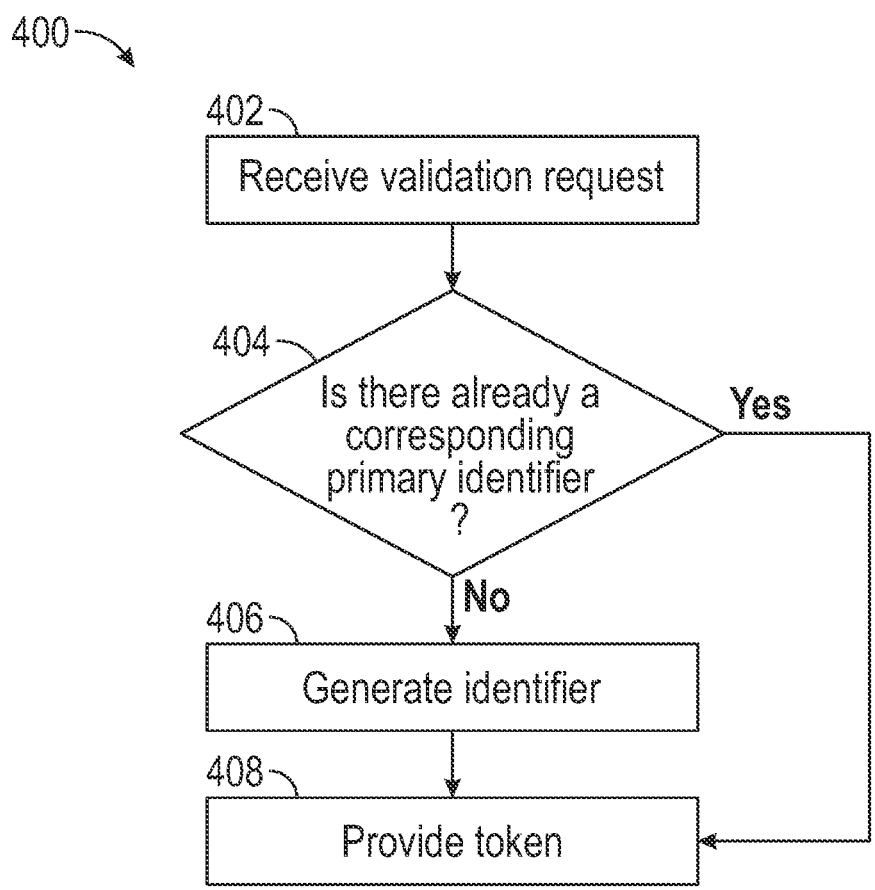
FIG. 4 is a flowchart of a method according to some embodiments.

FIG. 4 is a flowchart of a method 400 according to some embodiments. The method 400 can be implemented by processing circuitry 310, apparatus 302, or other components shown in FIG. 2 or FIG. 3.

The method 400 can begin with operation 402 with the processing circuitry receiving authentication tokens from a user 102. At operation 404, the processing circuitry 306 can determine whether the authentication tokens correspond to an identity associated with the user 102. At operation 406, if no correspondence is found, a new primary token can be generated. At operation 408, if a there is a valid correspondence between a user identity and one or more of the tokens provided in operation 402, the processing circuitry 306 can provide an indication that a corresponding computing session can be validated. In addition, processing circuitry 306 can set or increment a trust level for the user 102. In some examples, a primary token is provided back to the user 102 (using, for example, communication 310 (FIG. 3)). If a token expires, the computing session can be re-validated using any or all of the procedures described above.

Figure 5:
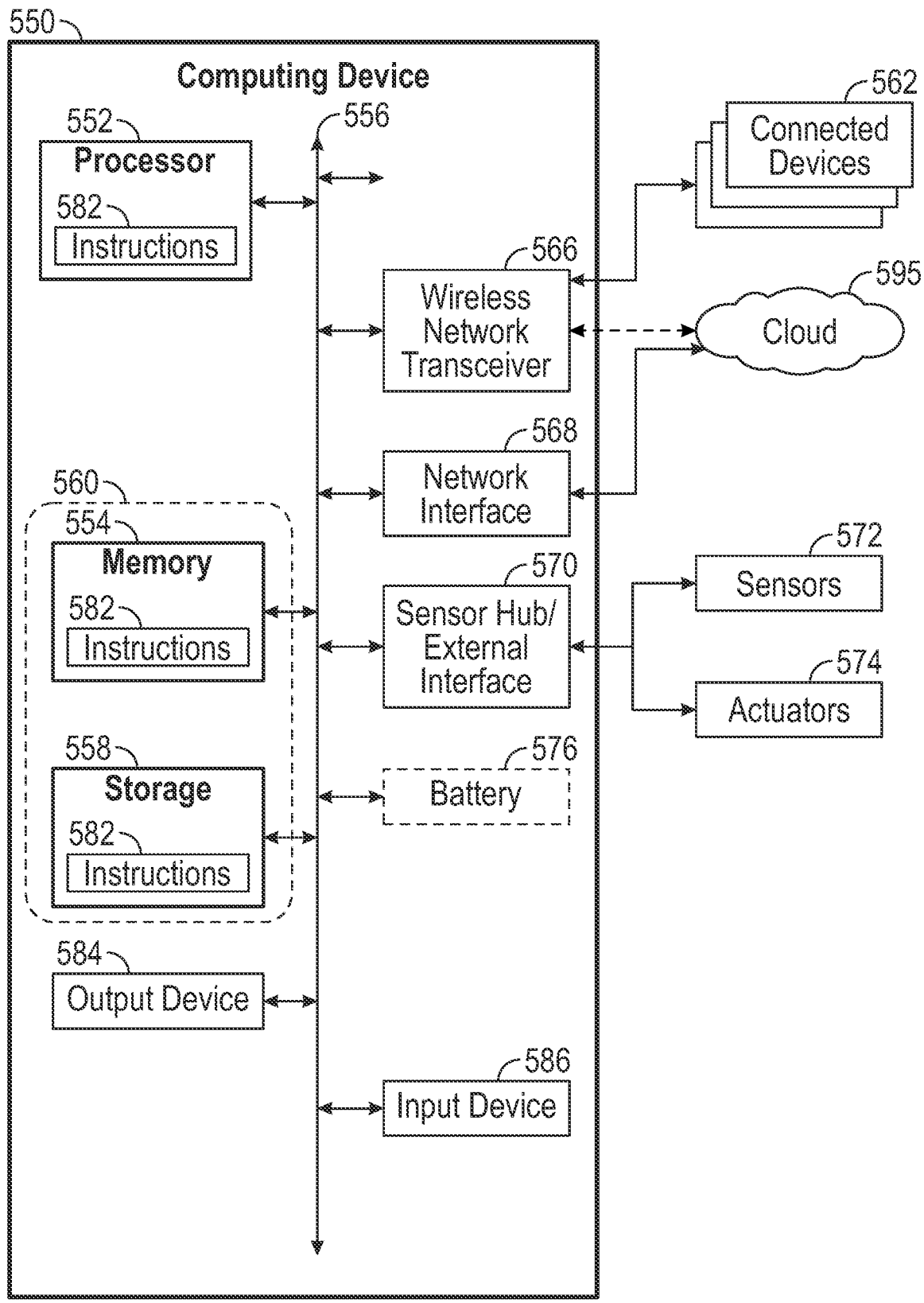
FIG. 5 provides a detailed overview of example components within a computing device in a computing system.

FIG. 5 provides a detailed overview of example components within a computing device 550 in a computing system. Computing device 550 may be embodied as a type of device, appliance, computer, or other "thing" capable of communicating with other Edge, networking, or endpoint components. For example, a computing device 550 may be embodied as a personal computer, server, smartphone, a mobile computing device, a smart appliance, an in-vehicle compute system (e.g., a navigation system), a self-contained device having an outer case, shell, etc., or other device or system capable of performing the described functions. The computing device 550 can perform operations for authenticating a user, using a plurality of user identities, and mapping the plurality of user identities to a primary token as described above with reference to FIG. 2-4.

This computing device 550 may include any combination of the hardware or logical components referenced herein, and it may include or couple with any device usable with an Edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the Edge computing device 550, or as components otherwise incorporated within a chassis of a larger system.

The instructions 582 on the processor 552 (separately, or in combination with the instructions 582 of the machine readable medium 560) may configure execution or operation of a centralized authorization apparatus (e.g., apparatus 302) that maps multiple user identities to one primary identity and one primary token that can enable user activities on multiple devices executing disparate or same operating systems.

The computing device 550 described above can include other components for performing operations in accordance with example embodiments. The computing device 550 may include processing circuitry in the form of a processor 552, which may be a microprocessor, a multi-core processor, a multithreaded processor, an ultra-low voltage processor, an embedded processor, an xPU/DPU/IPU/NPU, special purpose processing unit, specialized processing unit, or other known processing elements.

The processor 552 may communicate with a system memory 554 over an interconnect 556 (e.g., a bus). Any number of memory devices may be used to provide for a given amount of system memory. To provide for persistent storage of information such as data, applications, operating systems and so forth, a storage 558 may also couple to the processor 552 via the interconnect 556. The components may communicate over the interconnect 556. The interconnect 556 may include any number of technologies, including industry standard architecture (ISA), extended ISA (EISA), peripheral component interconnect (PCI), peripheral component interconnect extended (PCIx), PCI express (PCIe), or any number of other technologies.

The interconnect 556 may couple the processor 552 to a transceiver 566, for communications with the connected Edge devices 562 or with other devices (e.g., the different devices described with reference to FIG. 1 and FIG. 2, which can execute different operating systems or same operating systems, within a homogeneous or heterogeneous ecosystem). The transceiver 566 may use any number of frequencies and protocols. The wireless network transceiver 566 (or multiple transceivers) may communicate using multiple standards or radios for communications at a different range. For example, the computing device 550 may communicate with close devices, e.g., within about 10 meters, using a local transceiver based on Bluetooth Low Energy (BLE), or another low power radio, to save power. More distant connected Edge devices 562, e.g., within about 50 meters, may be reached over ZigBee® or other intermediate power radios.

A wireless network transceiver 566 (e.g., a radio transceiver) may be included to communicate with devices or services in a cloud (e.g., an Edge cloud 595) via local or wide area network protocols. Given the variety of types of applicable communications from the device to another component or network, applicable communications circuitry used by the device may include or be embodied by any one or more of components 564, 566, 568, or 570. Accordingly, in various examples, applicable means for communicating (e.g., receiving, transmitting, etc.) may be embodied by such communications circuitry.

Sensors 572 can include cameras or other imaging systems for performing user operations. Actuators can include motor controls or other controls of any computing systems or devices that may be included as described in FIG. 1. Output device 584 can include displays, and input device 586 can include keyboards, mice, etc. In examples, output device 584 and input device 586 can request and receive user 202 input for example entry of authentication information.

In an example, the instructions 582 provided via the memory 554, the storage 558, or the processor 552 may be embodied as a non-transitory, machine-readable medium 560 including code to direct the processor 552 to perform electronic operations in the computing device 550. The processor 552 may access the non-transitory, machine-readable medium 560 over the interconnect 556. For instance, the non-transitory, machine-readable medium 560 may be embodied by devices described for the storage 558 or may include specific storage units such as storage devices and/or storage disks that include optical disks (e.g., digital versatile disk (DVD), compact disk (CD), CD-ROM, Blu-ray disk), flash drives, floppy disks, hard drives (e.g., SSDs), or any number of other hardware devices in which information is stored for any duration (e.g., for extended time periods, permanently, for brief instances, for temporarily buffering, and/or caching). The non-transitory, machine-readable medium 560 may include instructions to direct the processor 552 to perform a specific sequence or flow of actions, for example, as described with respect to the flowchart(s) and block diagram(s) of operations and functionality depicted above. As used herein, the terms "machine-readable medium" and "computer-readable medium" are interchangeable. As used herein, the term "non-transitory computer-readable medium" is expressly defined to include any type of computer readable storage device and/or storage disk and to exclude propagating signals and to exclude transmission media.

While the illustrated examples of FIG. 5 include example components for a compute node and a computing device, respectively, examples disclosed herein are not limited thereto. As used herein, a "computer" may include some or all of the example components of FIG. 5 in different types of computing environments. Example computing environments include Edge computing devices (e.g., Edge computers) in a distributed networking arrangement such that particular ones of participating Edge computing devices are heterogenous or homogeneous devices. As used herein, a "computer" may include a personal computer, a server, user equipment, an accelerator, etc., including any combinations thereof. In some examples, distributed networking and/or distributed computing includes any number of such Edge computing devices as illustrated in FIG. 5, each of which may include different sub-components, different memory capacities, I/O capabilities, etc. For example, because some implementations of distributed networking and/or distributed computing are associated with particular desired functionality, examples disclosed herein include different combinations of components illustrated in FIG. 5 to satisfy functional objectives of distributed computing tasks. In some examples, one or more objective functions of a distributed computing task(s) rely on one or more alternate devices/structure located in different parts of an Edge networking environment, such as devices to accommodate data storage.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

We claim:

1. An apparatus including:
   an interface for receiving authentication tokens from a user; and
   processing circuitry coupled to the interface, the processing circuitry configured to:
   receive, over the interface, a first authentication token of the user and at least a second authentication token of the user;

determine whether the first authentication token and at least the second authentication token correspond to an identity associated with the user; and validate a computing session responsive to determining that the first authentication token and at least the second authentication token can be linked to the identity.

2. The apparatus of claim 1, wherein the processing circuitry is configured to set a trust level for the user subsequent to the validating.

3. The apparatus of claim 2, wherein the processing circuitry is configured to increase the trust level for the user responsive to receiving additional authentication tokens.

4. The apparatus of claim 1, wherein the first authentication token and at least the second authentication token correspond to authentication information for identity management systems.

5. The apparatus of claim 4, wherein the processing circuitry is configured to detect a type of the identity management systems and to perform validation based on the type.

6. The apparatus of claim 5, wherein the first authentication token is one of Open Authorization (OAuth) token, a Kerberos ticket, a Security Assertion Markup Language (SAML) assertion, and an Azure token.

7. The apparatus of claim 6, wherein the second authentication token is of a different type than the first authentication token.

8. The apparatus of claim 6, wherein the second authentication token is of a same type as the first authentication token.

9. The apparatus of claim 8, wherein the second authentication token corresponds to a different account of the user than the first authentication token.

10. The apparatus of claim 1, wherein the processing circuitry is configured to detect whether at least one of first authentication token and the second authentication token is expired and to re-validate responsive to detecting that at least one of the first authentication token and the second authentication token is expired.

11. The apparatus of claim 10, wherein expiration is determined based on a security level of an application associated with at least one of first authentication token and the second authentication token.

12. The apparatus of claim 1, wherein the processing circuitry is further configured to generate a primary token subsequent to validating the computing session.

13. The apparatus of claim 12, wherein the primary token comprises an aggregation of the first authentication token and at least the second authentication token.

14. A computer-readable medium including instructions that, when executed on processing circuitry cause the processing circuitry to perform operations including:

receiving a first authentication token of a user and at least a second authentication token of the user;

determining whether the first authentication token and at least the second authentication token correspond to an identity associated with the user; and validating a computing session responsive to determining that the first authentication token and at least the second authentication token can be linked to the identity.

15. The computer-readable medium of claim 14, wherein the operations further include:

setting a trust level for the user subsequent to the validating; and increasing the trust level for the user responsive to receiving additional authentication tokens.

16. The computer-readable medium of claim 14, wherein the first authentication token and at least the second authentication token correspond to authentication information for identity management systems, and wherein the operations further include:

detecting a type of the identity management systems; and performing validation based on the type.

17. The computer-readable medium of claim 16, wherein the first authentication token is one of Open Authorization (OAuth) token, a Kerberos ticket, a Security Assertion Markup Language (SAML) assertion, and an Azure token.

18. The computer-readable medium of claim 14, wherein the operations further include:

detecting whether at least one of first authentication token and the second authentication token is expired; and re-validating responsive to detecting that at least one of the first authentication token and the second authentication token is expired.

19. A method comprising:

receiving a first authentication token of a user and at least a second authentication token of the user;

determining whether the first authentication token and at least the second authentication token correspond to an identity associated with the user; and validating a computing session responsive to determining that the first authentication token and at least the second authentication token can be linked to the identity.

20. The method of claim 19, further comprising:

setting a trust level for the user subsequent to the validating; and increasing the trust level for the user responsive to receiving additional authentication tokens.

* * * * *